(12) United States Patent
Vrancken et al.

(10) Patent No.: US 9,077,707 B2
(45) Date of Patent: Jul. 7, 2015

(54) SYSTEM AND METHOD FOR ACCESSING PRIVATE DIGITAL CONTENT

(75) Inventors: Bart Vrancken, Leuven (BE);
Hendrikus G. P. Bosch, Amstelveen (NL); Mircea Strugaru, Timisoara (RO)

(73) Assignee: Alcatel Lucent, Boulogne-Billancourt (FR)

( * ) Notice: Subject to any disclaimer, the term of this patent is extended or adjusted under 35 U.S.C. 154(b) by 379 days.

(21) Appl. No.: 13/320,719

(22) PCT Filed: May 7, 2010

(86) PCT No.: PCT/EP2010/056288
§ 371 (c)(1),
(2), (4) Date: Dec. 15, 2011

(87) PCT Pub. No.: WO2010/136323
PCT Pub. Date: Dec. 2, 2010

(65) Prior Publication Data
US 2012/0102566 A1      Apr. 26, 2012

(30) Foreign Application Priority Data
May 29, 2009   (EP) .................................... 09305500

(51) Int. Cl.
G06F 12/14    (2006.01)
H04L 29/06    (2006.01)
G06F 21/33    (2013.01)
G06F 21/62    (2013.01)

(52) U.S. Cl.
CPC .......... *H04L 63/0807* (2013.01); *G06F 21/335* (2013.01); *G06F 21/6218* (2013.01); *H04L 63/10* (2013.01)

(58) Field of Classification Search
CPC . G06F 21/3335; G06F 21/6218; H04L 63/10; H04L 63/0807
See application file for complete search history.

(56) References Cited

U.S. PATENT DOCUMENTS

2002/0046352 A1    4/2002   Ludwig
2007/0289002 A1*  12/2007   van der Horst et al. ........... 726/9
2009/0254978 A1*  10/2009   Rouskov et al. .................. 726/4

OTHER PUBLICATIONS

OAuth Core Workgroup, OAuth Core 1.0, Dec. 4, 2007, 1.0.*
Hammer-Lahav E et al; The OAuth Core Protocol; draft-hammer-oath-02.txt; Internet draft; Internet Engineering Task Force; IETF; Mar. 23, 2009; XP015060627.
Oauth Core Workgroup; OAuth Core 1.0 Revision A; Jun. 24, 2009; 29 ages; http://oauth.net/core/1.0a/.

* cited by examiner

*Primary Examiner* — Kambiz Zand
*Assistant Examiner* — Nega Woldemariam
(74) *Attorney, Agent, or Firm* — Patti and Malvone Law Group, LLC

(57) ABSTRACT

Method for providing access to private digital content owned by an owner and installed on a content server, wherein a content manager server has a number of clients potentially interested in the private content, the method comprising the following steps performed at a content management server being informed that the owner has installed private content on a content server; obtaining a delegate token from the content server; receiving a query for the private digital content from a client of the number of clients of the content management server; providing said client with a token using the delegate token enabling the client to access the private content.

19 Claims, 9 Drawing Sheets

SYSTEM AND METHOD FOR ACCESSING PRIVATE DIGITAL CONTENT

TECHNICAL FIELD

The present invention relates to a system and method for accessing private digital content, a content management server, a secure content server, and a method for secure communication.

BACKGROUND

There exists an Open authentication (OAuth) protocol (see OAuth Specification 1.0 available at http://oauth.net/license/core/1.0) to handle user credentials between multiple parties on the web. Further, there exist a number of token-based sharing solutions that enable content sharing between web entities similar to the before mentioned OAuth system. For instance, Facebook, Flickr, Google, Smugmug and Photobucket all use tokens for authentication.

SUMMARY OF THE INVENTION

According to embodiments of the invention there is provided an improved method and system for sharing private content which is convenient for the owner of the private content and yet provides sufficient security.

According to an embodiment of the invention there is provided a method for providing access to private digital content owned by an owner and installed on a content server, wherein a content manager server has a number of clients potentially interested in the private content, the method comprising the following steps performed at a content management server:
  being informed that the owner has installed private content on a content server;
  obtaining a delegate token from the content server;
  receiving a query for the private digital content from a client of the number of clients of the content management server;
  providing said client with a token using the delegate token enabling the client to access the private content.

A content management server in the context of the present invention has to be interpreted in the broad sense referring to any server capable of managing for example public and/or private shared and/or private unshared digital content of a plurality of users, such as pictures, video's, etc. The content itself can be stored locally or at a remote location. Examples of such a content management server are simple content management servers, such as used by content providers like Flickr, YoutTube, etc, any type of content aggregators such as PeCMan, SecondBrain, iGoogle, any types of owner's proxies, proxies with selective proxy functionality, etc. A preferred embodiment of such a content management server will be adapted to allow tagging of the content.

A content server in the context of the present invention typically refers to a secure content server, and can for example be a secure Web-server. Other examples are a local disc with file sharing capabilities, any computer having installed thereon a server program so that the computer functions as a content server, etc.

A token in the context of the present invention is a value generated upon verification of a number of credentials of the requester of the token. This value is typically a string of a number of characters generated at random by a content server.

According to a preferred embodiment of the invention the delegate token is generated with the help of the owner of the private digital content and is used to speak for the owner of the content. The obtaining of a delegate token by the content management server comprises for example:
  obtaining a first token T1 from the content server;
  requesting the owner to authorize the first token;
  receiving an authorized first token;
  requesting to replace the authorized first token with a second token T2 through the content server, wherein said second token T2 forms the delegate token. The first token will typically be a so-called request token which is a value used by a client (here the content management server) to obtain authorization from the owner, and which can be exchanged for a second token typically called an access token being a value used by the client (the content management server) to gain access to the protected content on behalf of the owner, instead of using the owner's content server's credentials.

According to a possible embodiment the providing of said client with a token using the delegate token comprises the following steps performed by the content management server:
  sending a request for exchanging the delegate token for a client access token T3 to the content server;
  receiving the access token T3; and
  forwarding the access token T3 to the client.

The newly created access token T3 may typically have equal or less rights than allowed by the delegate token. An advantage of the method is that the client does not have to be registered with the content server.

According to an alternative embodiment the providing said client with a token using the delegate token comprises the following steps performed by the content management server:
  receiving a request token T4 from the client;
  authorizing said token using the delegate token;
  sending said authorized request token T4 to the client enabling the client to change this authorized request token for an access token T5 through the content server.

According to another aspect of the invention there is provided a method for obtaining private digital content by a client of a content management server, which private content is owned by an owner and installed on a content server, comprising the following steps performed by the client:
  sending a request for obtaining private digital content to the content management server having a delegate token associated with the digital private content;
  obtaining a token from the content management server generated using the delegate token and allowing the client to access the private digital content;
  accessing the private digital content.

According to a first example the obtaining a token from the content management server can consist in obtaining an access token T3 which has been obtained previously by the content management server on the basis of his delegate token through the content server.

According to a second example the obtaining a token from the content management server can comprise the following steps performed by the client:
  sending a request for a token to the content server;
  receiving the request token T4 from the content server;
  sending the received request token to the content management server for being authorized;
  receiving the request token authorized by the content management server using his delegate token;
  sending this authorized request token to the content server; and
  receiving an access token T5 from the content server enabling the client to access the private content.

According to yet another aspect of the invention there is provided a method for providing access to private digital content owned by an owner and installed on a content server, comprising the following steps performed at the content server:
 generating a delegate token for a content management server which delegate token is authorized by the user;
 sending said delegate token to the content management server.

According to a preferred embodiment one or more standard Open Authentication calls are used for performing the method steps.

According to an embodiment of the system of the invention, the system comprises a content management server having a primary client owning digital private content stored on a content server; and a number of secondary clients; wherein the content management server is adapted to obtain a delegate token associated with the digital private content from the content server and to deliver a token to a secondary client using the delegate token enabling the second client to access the digital private content; and
the secondary client is adapted to present the delivered token to the content server for obtaining access to the digital private content.

According to a preferred embodiment the primary client is further adapted to authorize a request token received from the content management server through the content server. The content management server can then be further adapted to receive the authorized request token and to obtain a delegate token using said authorised request token.

According to another aspect of the invention there is provided a content management server for organizing private digital content of a plurality of clients, a primary client owning digital private content stored on a content server, said content management server being adapted to obtain from the content server a delegate token associated with the digital private content of an owner client and to deliver a token to a secondary client using the delegate token to enable the secondary client to access the private content of the owner client. According to an exemplary embodiment the content management server is a content aggregator such as a PeCMan server.

According to a further developed embodiment the content management server is further adapted to provide a client with a token related to the private content having equal or less access rights when compared with the delegate token.

According to yet another aspect of the invention there is provided a content server such as a secure web-server storing an owner's private digital content adapted
 to receive from a content management server a request token authorized by the owner,
 to exchange this authorized request token for a delegate token, and
 to send the delegate token to the content management server.

Finally the invention relates to a computer program product comprising computer-executable instructions for performing any of the methods of the invention, when the program is run on a computer.

According to an embodiment of the invention an open authentication protocol method is provided which is extended with support for delivering delegation tokens to a management server, such as a PeCMan server, a user proxy or any other suitable entity. Those delegation tokens are generated with the help of the owner of the private digital content and are used to speak for the owner of the content. In that way, instead of the owner having to present owner credentials to a private content Web-server every time a secondary client requests access to the private digital content, a delegation token can be provided by the management server without the owner having to intervene. The owner will only have to intervene once, when the management server obtains the delegate token. An advantage is a secondary client can access private content without holding the owner's user credentials. When the method is applied in PeCMan, the PeCMan server does not require proxy functionality for sharing private content as in the methods of the prior art.

According to an embodiment of the invention the OAuth protocol method has been extended with authentication delegation operations to enable the content manager, such as PeCMan or a user proxy to speak for the content owner. Thus: when a client stores private content in a storage provider, it arranges the creation of a long-term delegation token to be stored with the URLs. If private data is to be shared through the content manager, this delegation token can be used in the OAuth protocol to authenticate request tokens.

According to another embodiment of the invention there is provided a content management server, such as a PeCMan server or user proxy, holding delegation tokens for private content. According to a possible embodiment, the content management server is adapted to authorize request tokens from a secondary client with which this secondary client can access data on a private content location, e.g. a secured website, without the owner's further involvement.

According to an embodiment of the invention there is provided a system using an extended OAuth protocol with support for the delegation of authentication authority from the owner of the content to a content management server, such as a PeCMan server or a owner's proxy. More in particular, content owners are able to delegate responsibility for webserver authentication to the content management server such that the content owner does not have to authenticate himself, and does not even have to be present when content is shared with friends, buddies, or other interested parties.

According to an embodiment of the invention there is provided a method using an OAuth protocol extended with a procedure to delegate authentication authority, comprising the notion of a delegation token which is to be shared between a content owner, a private content server and a content management server. When a secondary client needs access to private content, the content management server can present its delegation token as proof that the content owner has empowered the content management server to speak for it. Typically the content management server will act as a proxy for the original content owner.

According to a further embodiment the new OAuth delegation mechanism implies that the content management server can enforce its own access control policies on content that is shared through the content management server. The delegation token enables access to private shared content with certain access rights. According to a possible embodiment the content management server is adapted to restrict those access rights.

DESCRIPTION OF THE DRAWINGS

The accompanying drawings are used to illustrate presently preferred non-limiting exemplary embodiments of the present invention. The above and other advantages features and objects of the invention will become more apparent and the invention will be better understood from the following detailed description when read in conjunction with accompanying drawings in which.

DETAILED DESCRIPTION

Figure 1:
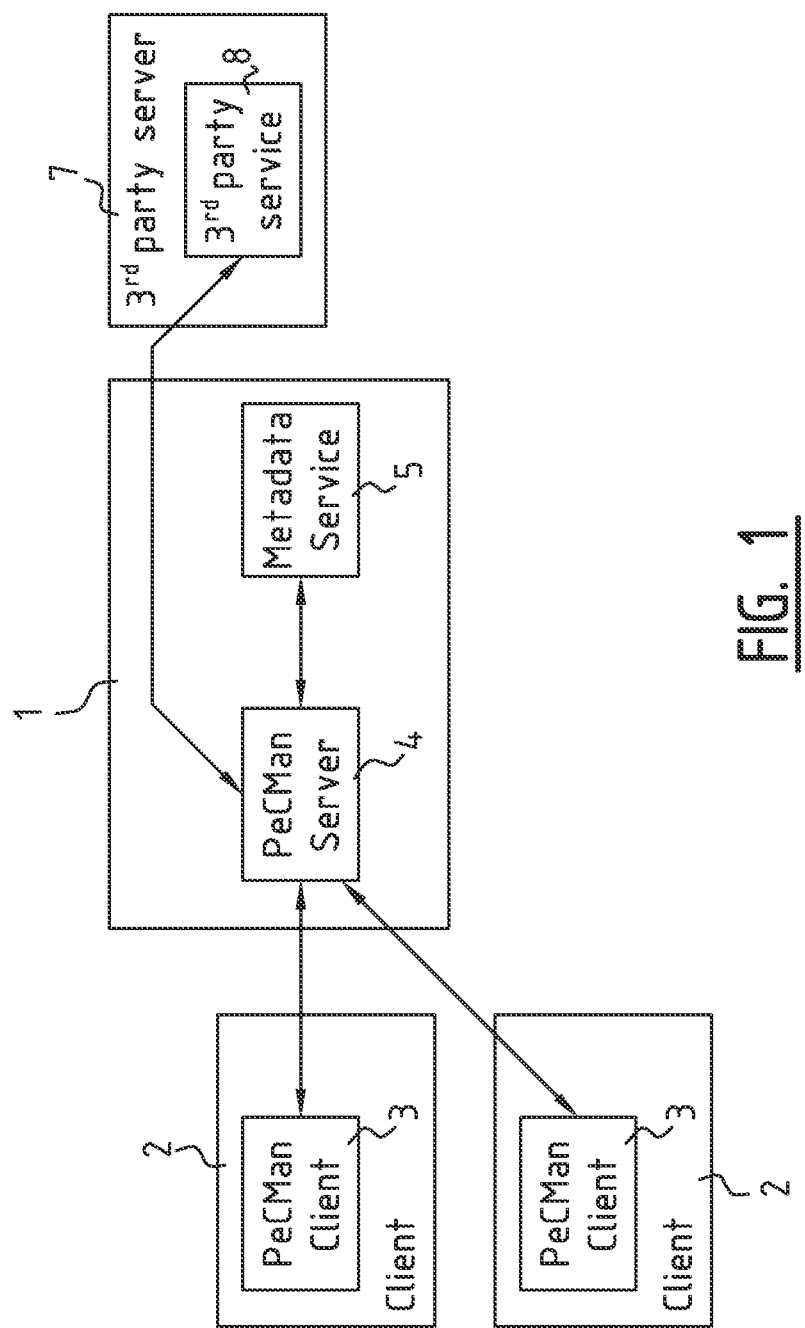
FIG. 1 is a schematic view of the PeCMan architecture.

The invention will be illustrated below referring to a PErsonal Content MANagement (PeCMan) server as the content management server, but the skilled person will understand that the invention is applicable to any type of content management server (including owner's proxies) as defined above. PeCMan is a web tool that organizes user's digital content such as documents, pictures, videos, etc. FIG. 1 shows a schematic view of the PeCMan architecture. A user interacts with the system 1 using a client component 3 (e.g. a web client, a desktop client or a client on a PDA, etc.) via which the user can e.g. add, remove or tag documents. An incoming request from a client 2 is received by a server component 4 to be processed by the system 1. The system further comprises a metadata section 5 for storing metadata extracted from the documents or user-generated in the form of tags. The server component 4 can further communicate with a number of third party services 8 of third party servers 7.

Users can for example upload URLs in PeCMan, semantically tag the information with free-format tags and later find that information back by querying PeCMan with the same tags. Since multiple URLs can be tagged with the same tags, PeCMan enables a user to organize all objects that are kept on a plethora of storage providers (e.g. web servers, home stores or mail servers) through one logical location akin a "virtual drive".

PeCMan recognizes three kinds of references: public, private non-shared and private shared content. Public content are URLs pointing at publicly available web sources. Accessing such content does not require user credentials, which implies that one can easily share such content with whomever is interested in that content. When public information is shared between users, PeCMan simply sends the requested URLs directly to the requesting or secondary PeCMan client and the secondary PeCMan client retrieves the content through e.g. WebDAV or HTTP.

Private content is typically content that can only be accessed through a secured location, typically a secured website (i.e. storage providers). To access secured storage providers 7, a web client 3 first establishes a secure connection e.g. through SSL/TLS, and then provides the user credentials (typically a user-ID and password) to authenticate the user. After a user is authenticated, a web client 3 can access privately stored content.

Typically inside the addressed web server 7 a state is allocated that is associated with the communication channel. This state indicates to the web server 7 that the requesting web client 3 has authenticated itself.

According to the prior art, to support private non-shared and shared content, PeCMan typically stores the user credentials with the URL that is being pointed at. If private content is being addressed, a secondary PeCMan client 3 sets up a communication channel to PeCMan 1, which then establishes a connection to the storage provider 7 on behalf of the secondary PeCMan client, i.e. the PeCMan server 4 acts as proxy for the secondary PeCMan client 3. This proxy maintains the secure connection to the web server 7 and is also the one that provides the user credentials to the storage provider 7. PeCMan does this for both shared and non-shared private content references.

The downside of this method of data sharing in PeCMan for private content is that all data associated with the objects pointed at are transmitted through the PeCMan proxy. This means that PeCMan can become a bottleneck for accessing private content and that if charges are associated with data transfers through PeCMan, the PeCMan operator may incur hefty fees for offering private content. Further, executing the proxy in the realm of the web client is typically not an option since that would imply that user credentials of users need to be shared with the secondary PeCMan client.

Open authentication (OAuth) is an open protocol (see OAuth Specification 1.0 available at http://oauth.net/license/core/1.0) to handle user credentials between multiple parties on the web.

Figure 2:
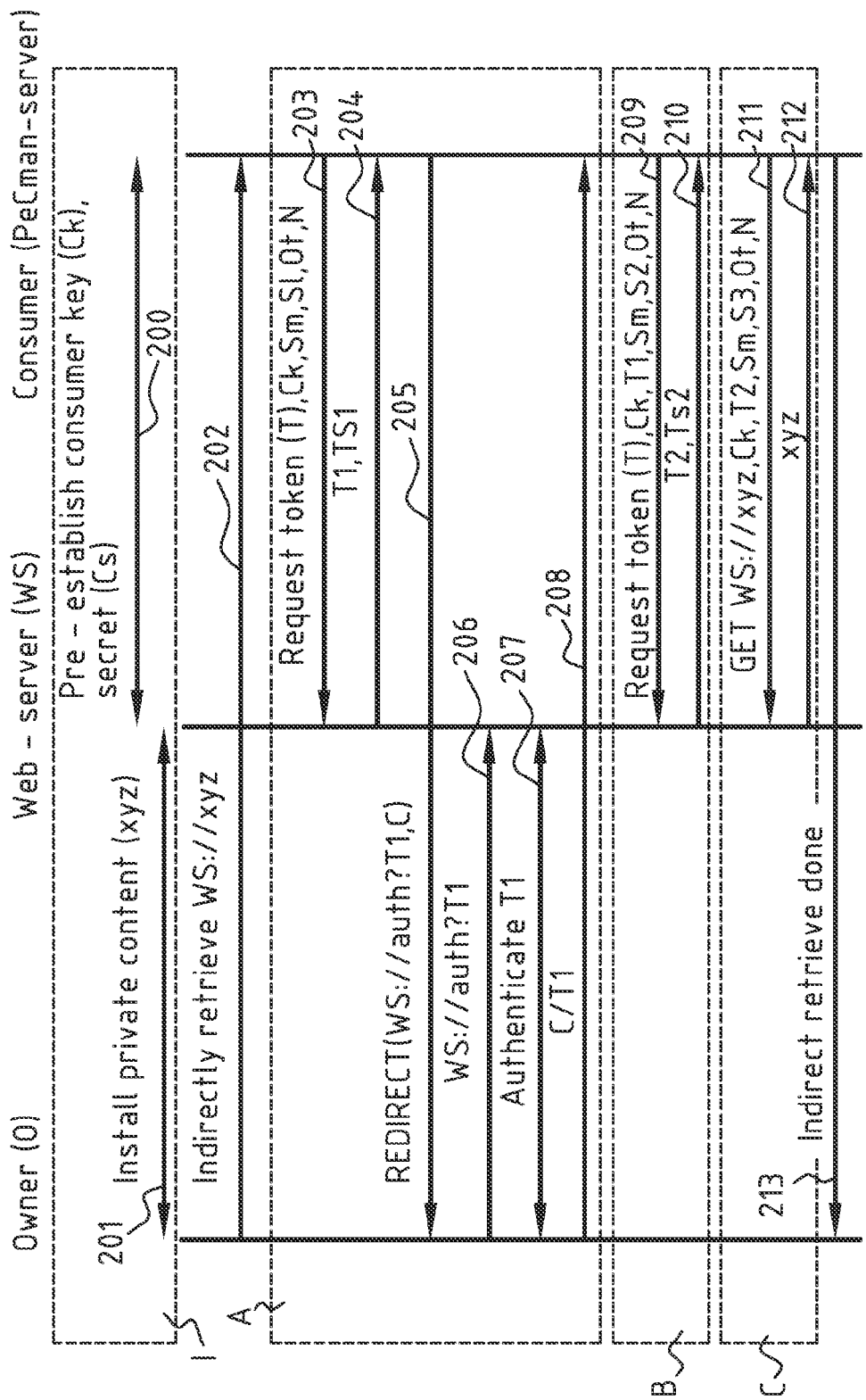
FIG. 2 illustrates a call flow according to a first embodiment of a method of the invention for delegating a PeCMan server.
Figure 3:
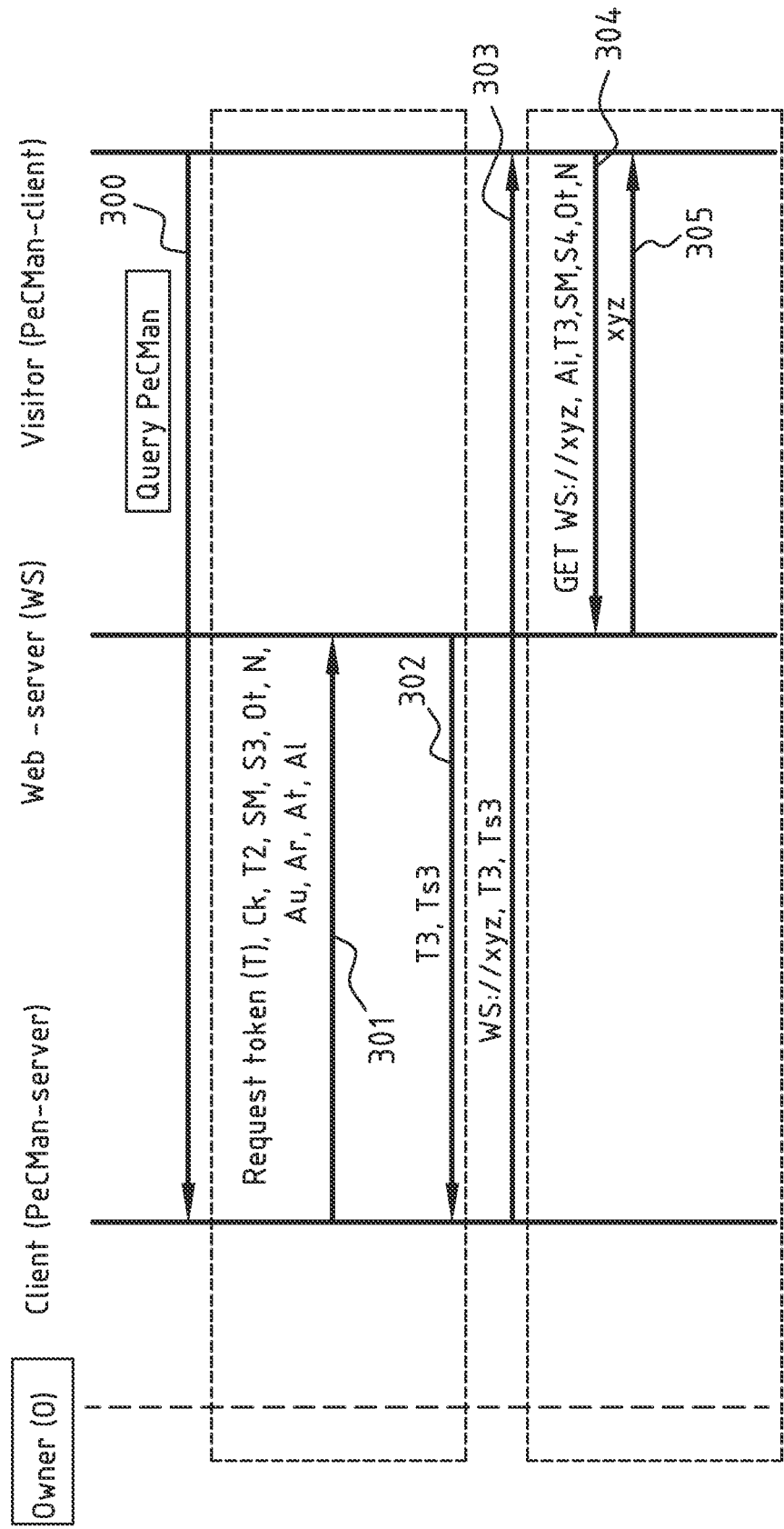
FIG. 3 illustrates a call flow according to a first embodiment of a method of the invention for retrieving private content by a secondary PeCMan client.

According to an embodiment of the invention OAuth is used to share private data between a private content provider and a third entity, so that the third entity can access the user's private data without having to know the user credentials through a token-based authentication mechanism which is illustrated in FIGS. 2 and 3.

In a first stage of an embodiment of the method of the invention a delegate token is obtained by a content management server, such as a PeCMan server, as illustrated by the call flow of FIG. 2, showing an exemplary delegation procedure for authorizing a PeCMan server to speak for a content owner 0. The PeCMan server will function as a client of a private content server, here a secure Web-server WS.

In an initiation phase I the PeCMan server establishes a secure connection with the Web-server WS, wherein a consumer key Ck and a secret key Cs is established between them, see arrow 200. Also, the owner O installs private content xyz directly on the Web-server WS, see arrow 200. Typically the owner will log in the secure Web-server using a user name and password, whereupon he can install the private content xyz. Next the owner O informs the PeCMan server that it has installed private content xyz on the protected Webserver, see arrow 202.

Being informed about the installed private content, the PeCMan server will request a token and have this token authenticated by the owner in a stage A of the call flow. First the PeCMan server requests a token from the Web-server WS, see arrow 206. This can be a standard OAuth request call which contains the following parameters: the consumer key Ck (oauth_consumer_key), the signature method Sm (oauth_signature_method), a signature S1 (oauth_signature), a timestamp Ot (oauth_timestamp) and a nonce N (oauth_nonce). The signature S1 can for example be created using Cs. Typically the client will first generate the timestamp and then a Nonce value is generated that is unique for each request. The Web-server WS then generates a token T1 (oauth_token) and a Token secret Ts1 (oauth_token_secret), and sends those to the PeCMan server, see step 204. The PeCMan server then sends a redirect message (step 205) to the owner for obtaining approval from the owner by directing the owner to the Web-server WS. This can be a standard OAuth request to the Web-server's user authorization URL "WS://auth?", including the token T1 and a call back URL C, which is a URL the Web-server will use to redirect the owner back to PeCMan server. The authorization request is then passed through to the Web-server (step 206) and the Web-server will authenticate the token T1, typically verifying the identity of the PeCMan server and asking the owner for consent (step 207). For example, a secure connection to the private content provider (Web-server WS) is established, logging in by offering the PeCMan's credentials and associating the token with the secure connection. The PeCMan server is then notified by the owner O that the token T1 has been authorized using the call back URL (step 208), e.g. using a standard OAuth call.

The PecMan server will now request a second token using his first token T1 (step 210). This can for example be done using a standard OAuth request for exchanging a request token for an access token with the following parameters: the consumer key Ck (oauth_consumer_key), the token obtained previously T1 (oauth_token), the signature method Sm (oauth_signature_method), a signature S2 (oauth_signature), a timestamp Ot (oauth_timestamp) and a nonce N (oauth_nonce). The signature S2 can for example be calculated on the basis of Cs and Ts1. In reply a second token T2 and Token secret Ts2 are granted by the Web-server WS (step 210). This second token T2 can function as a delegate token for giving a secondary client (a visitor) access to the owner's private content as will be illustrated in FIGS. 3 and 4.

The private content xyz can also be obtained by the PeCMan server, by offering the token T2 to the Web-server WS, see stage C in the call flow of FIG. 2. This can be done using a standard access request containing for example the following parameters: the consumer key Ck (oauth_consumer_key), the token T2 (oauth_token), the signature method Sm (oauth_signature_method), a signature S3 (oauth_signature), a timestamp Ot (oauth_timestamp) and a nonce N (oauth_nonce). The signature S3 can for example be calculated using Cs and Ts2. Note that the steps of stage C will not necessarily have to be performed by the PeCMan server, since T2 can also only be used as a delegate token giving secondary clients access to the owner's private content without having to disturb the owner.

A first embodiment of a method for retrieving of an access token by the visitor is illustrated in FIG. 3. In a first step 301 the PeCMan client sends a query to a PeCMan server for obtaining access to certain private content. In reply to this query the PeCMan server sends a token request message to the Web-server, for example using a request with the following parameters: the consumer key Ck (oauth_consumer_key), the token T2 (oauth_token), the signature method Sm (oauth_signature_method), a signature S3 (oauth_signature), a timestamp Ot (oauth_timestamp) and a nonce N (oauth_nonce), an access URL Au (Access_url), access rights Ar (Access_rights), an access time period At (Access_timePeriod) and an access IP Ai (Access_IP). The signature S3 can for example be calculated using Cs and Ts2. The access URL typically refers to a collection of private data such as a certain directory containing the data to be obtained xyz. The access rights are the rights related to content (reading, modifying, etc). The time period is the period in which the token is valid. The access IP is typically optional and refers to the address of the visitor. In a following step 302 the Web-server grants a third token T3 and a corresponding token secret Ts3 to the PeCMan server which notifies the visitor that the requested private content xyz is associated with token T3 and token secret Ts3 (step 303). The visitor can now obtain the private data xyz as illustrated in steps 304 and 305. This can be done using an access request for example containing the following parameters: the access IP Ai, the token T3 (oauth_token), the signature method Sm (oauth_signature_method), a signature S4 (oauth_signature), a timestamp Ot (oauth_timestamp) and a nonce N (oauth_nonce). The signature S4 is for example calculated using Ts3.

The newly created tokens T3 may have equal or less rights when compared to the original tokens T2. With these derived access tokens T3 the secondary PeCMan clients can obtain content directly from a Web-server without having to interact with the owner.

One of the benefits of the above embodiment is that the secondary client, with whom content is shared, does not have to be registered with the Web-server. By enabling the PeCMan server to further delegate tokens T3 to secondary clients (visitors), content can be shared with users that have not registered with the Web-server WS, however without making the content completely public. Another benefit for the PeCMan server is that it can enforce its own policies on top of the Web-server's policy. With this embodiment the PeCMan server can distribute and delegate content through a certain web service to secondary users based on the granularity that is defined by the owner. As another client requires access to the content from the owner, the PeCMan server verifies if the owner has shared information with that secondary client, checking e.g. a client database, before issuing a derived access token T3.

Figure 4:
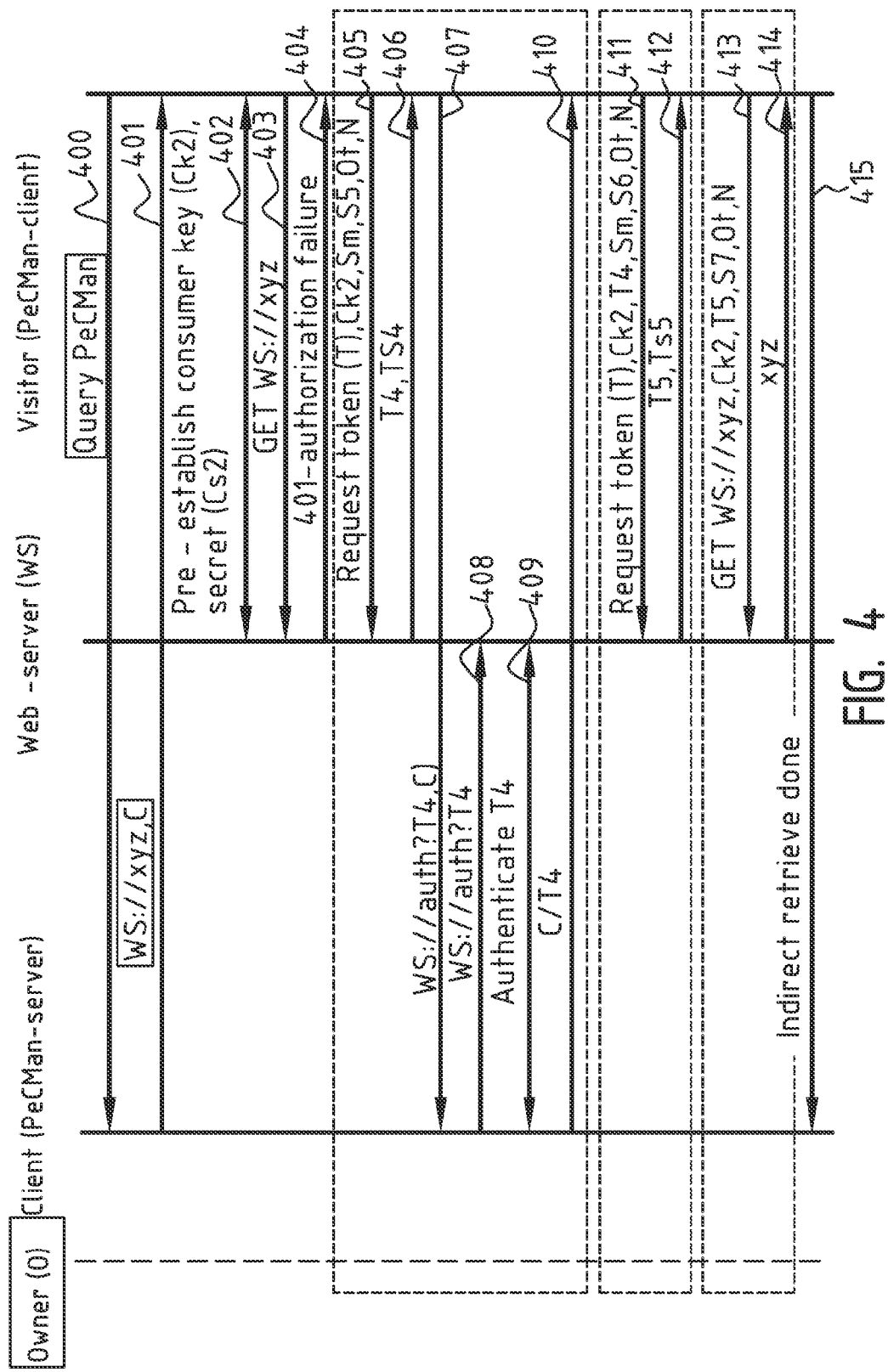
FIG. 4 illustrates a call flow according to a second embodiment of a method of the invention for retrieving private content by a secondary PeCMan client.

FIG. 4 shows another embodiment of the procedure performed by a secondary PeCMan client for accessing private content by way of a delegated token. A secondary PeCMan client (visitor) requests content through the PeCMan server (step 400) and the PeCMan server indicates that the content xyz can be retrieved through a protected Web-server WS (step 401). The client will typically proceed by first trying to access the secured content, see step 402 where a consumer and secret key are established and step 403 where the content is requested. However, as the content is private content which is only accessible by means of a token, the Web-server WS responds with an authentication failure (step 404). Thus, the client then requests and obtains a token T4 from the Web-server, see steps 406 and 407, using for example a standard OAuth request with the parameters: the consumer key Ck2 (oauth_consumer_key), the signature method Sm (oauth_signature_method), a signature S5 (oauth_signature), a timestamp Ot (oauth_timestamp) and a nonce N (oauth_nonce). The signature is for example calculated with Cs2. The request token T4 is offered to the PeCMan server for authentication (step 407) assuming that a delegation token exists for the content. When the PeCMan server receives the authentication request with the client's request token, the PeCMan server determines who requests access to the content. If the PeCMan server can grant access to the client, it authorizes access using its delegation token T2, delegation secret Ts2, see step 408. When the Web-server receives the authentication request based on the delegation token, the Web-server authenticates the client's request token T4, see step 409. This request token T4 is then sent back through PeCMan to the requesting secondary client, see step 410. The requesting client completes the procedure using standard OAuth procedure calls (steps 411-414) on receipt on the authenticated request token T4: the client exchanges the authenticated request token T4 for an access token T5 (steps 411 and 412), wherein the message can e.g. be signed with a signature S6 calculated on the basis of Cs2 and Ts4. The actual data xyz can then be obtained by offering the access token T5 to the Web-server WS, see step 413, whereupon the data xyz is sent to the client C, see step 414. The GET message 413 can for example be signed with a signature calculated on the basis of Cs2 and Ts5.

Figure 5:
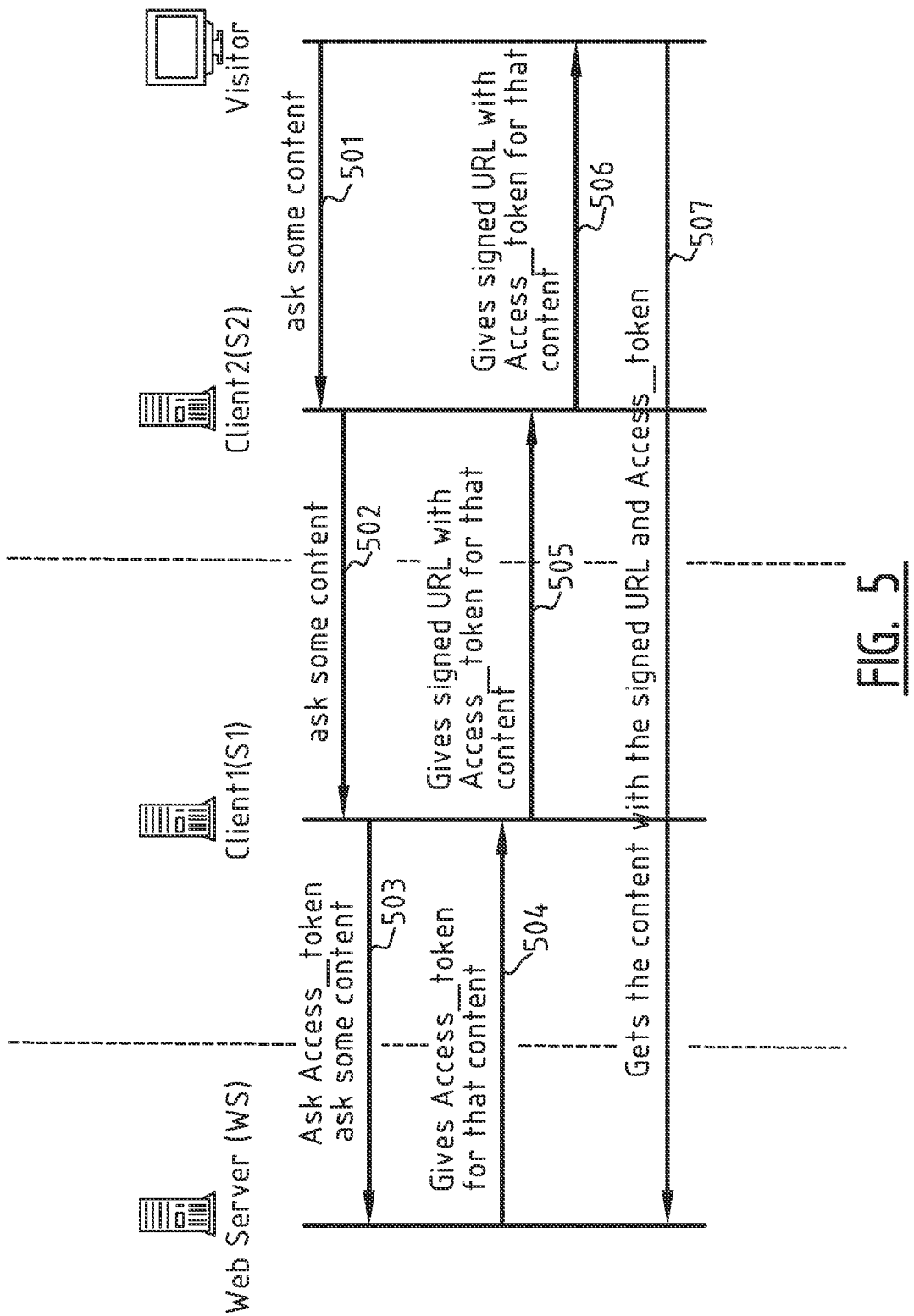
FIG. 5 illustrates a call flow according to a third embodiment of a method of the invention for retrieving private content.

FIG. 5 illustrated a more general embodiment of a method of the invention, where a client and a first and secondary server S1, S2 that each have been authenticated and have some rights on some content, are able to ask the respective access token holder (S2 is the holder as seen by C, S1 is the holder as seen by S2 and WS is the holder as seen by S1) to obtain another access token, with the same or less rights as the delegate token of the respective first and secondary servers. The servers S1 and S2 are typically both content management servers and could for example both be PeCMan servers. S1 could also be a content management server on a local website. The example illustrates that a visitor can do a query to a server S2 being a client of a server S2. The server S2 has a delegate token for the requested content and can obtain an access token for than content from a content server WS (see steps 503 and 504). The server S1 can then send an access token with equal or less rights to the server S2 (stap 505) which will in turn send an access token with equal or less rights to the visitor (step 506). The skilled person will understand that a similar transitive share embodiment is possible using the way of retrieving illustrated in FIG. 4.

Figure 6:
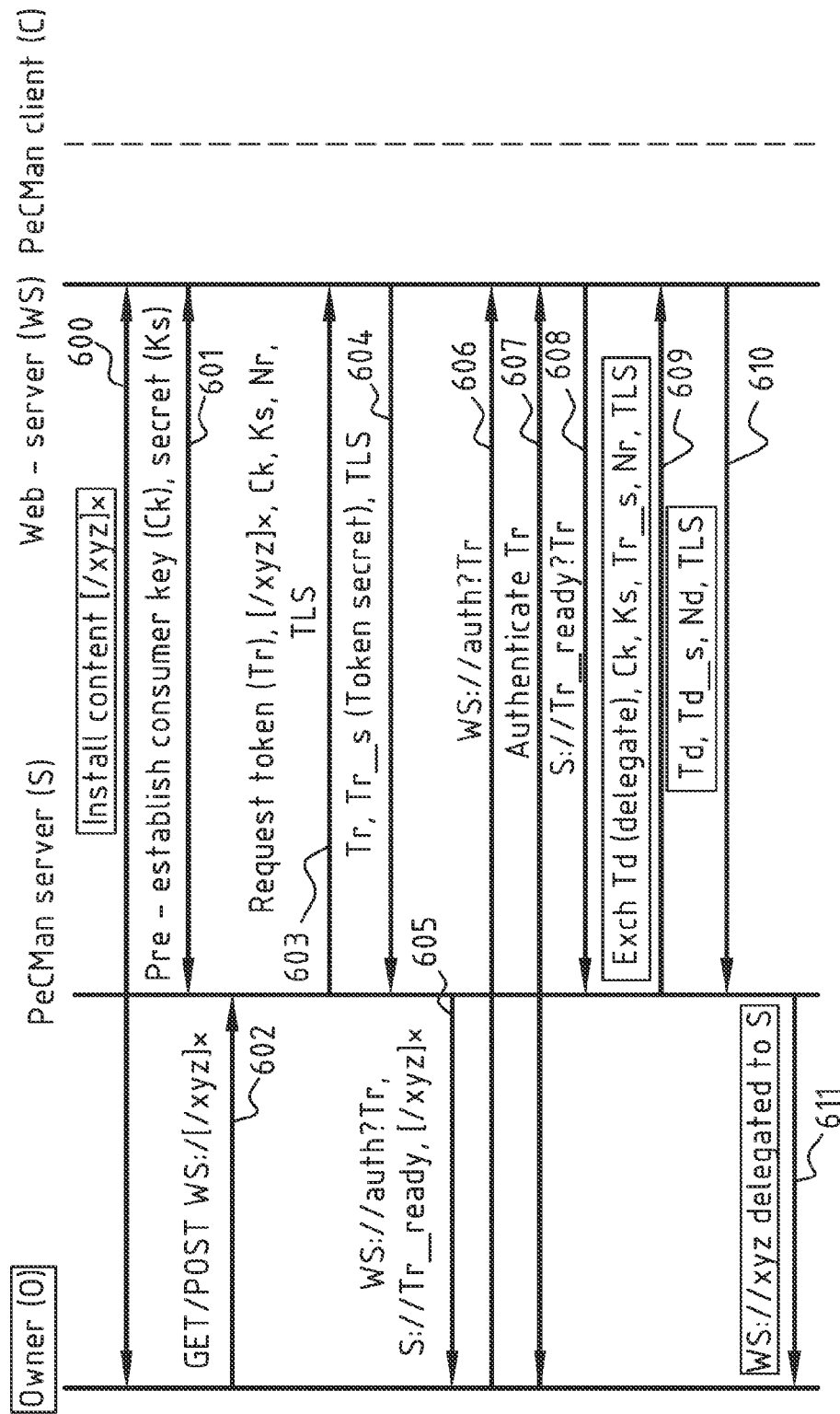
FIG. 6 illustrates a call flow according to a second embodiment of a method of the invention for delegating a PeCMan server.

FIG. 6 illustrates a variant of the call flow of FIG. 2, wherein token T1 in FIG. 2 corresponds with token Tr in FIG. 6 and token T2 with token Td. Steps 601-603 correspond with steps 301-303, wherein the GET or POST call is used to inform the PecMan server that he should indirectly retrieve the private content installed on the Web-server. In steps 603 and 604, the PeCMan server obtains a token Tr via a tunnel (e.g. TLS or https). Both these calls are transmitted over a secure communication channel, e.g. SSL/TLS as defined by RFC4346 with the title "The Transport Layer Security (TLS) Protocol". The PeCMan server then requests the owner of the content to authenticate the request token through the secure Web-server WS, similar to the standard OAuth approach, see steps 605-606. The owner O provides the credentials to the Web-server WS and the Web-server WS allocates a state that records that the request token is now valid and authenticated, see steps 606 and 607. Finally, the Web-server calls back to the PeCMan server to inform it that the request token has now been authenticated, see step 608. The PeCMan server then requests to replace the authenticated request token with a delegation token through the Web-server WS, see step 609. The Web-server WS returns a delegate token (Td), an associated secret delegate token (Td_s) and a nonce (Nd) to the PeCMan server via a tunnel, see step 610. Finally, the PeCMan server responds in step 611 to the original HTTP POST request (step 602) identifying the success or failure of the delegation procedure. The Web-server stores the delegation token Td, its lifetime, and the original owner of the content. This delegation token Td replaces the user credentials, i.e. the holder of the delegation token Td can authenticate request tokens as if he is the owner of content. A "request for access" message that is signed with the delegation token Td signifies to a Web-server WS that the request for access is based on delegated authority.

According to another embodiment the original authenticated request token can be used as a delegation token. However, it is usually preferred to have a separate token to distinguish between the differences in functionality. In OAuth today, an authenticated request token Tr can only be exchanged for an access token Ta and the access policy is set by the Web-server WS. The authorization delegation procedure with its delegation tokens Td can be used further restrict access to content.

Figure 7:
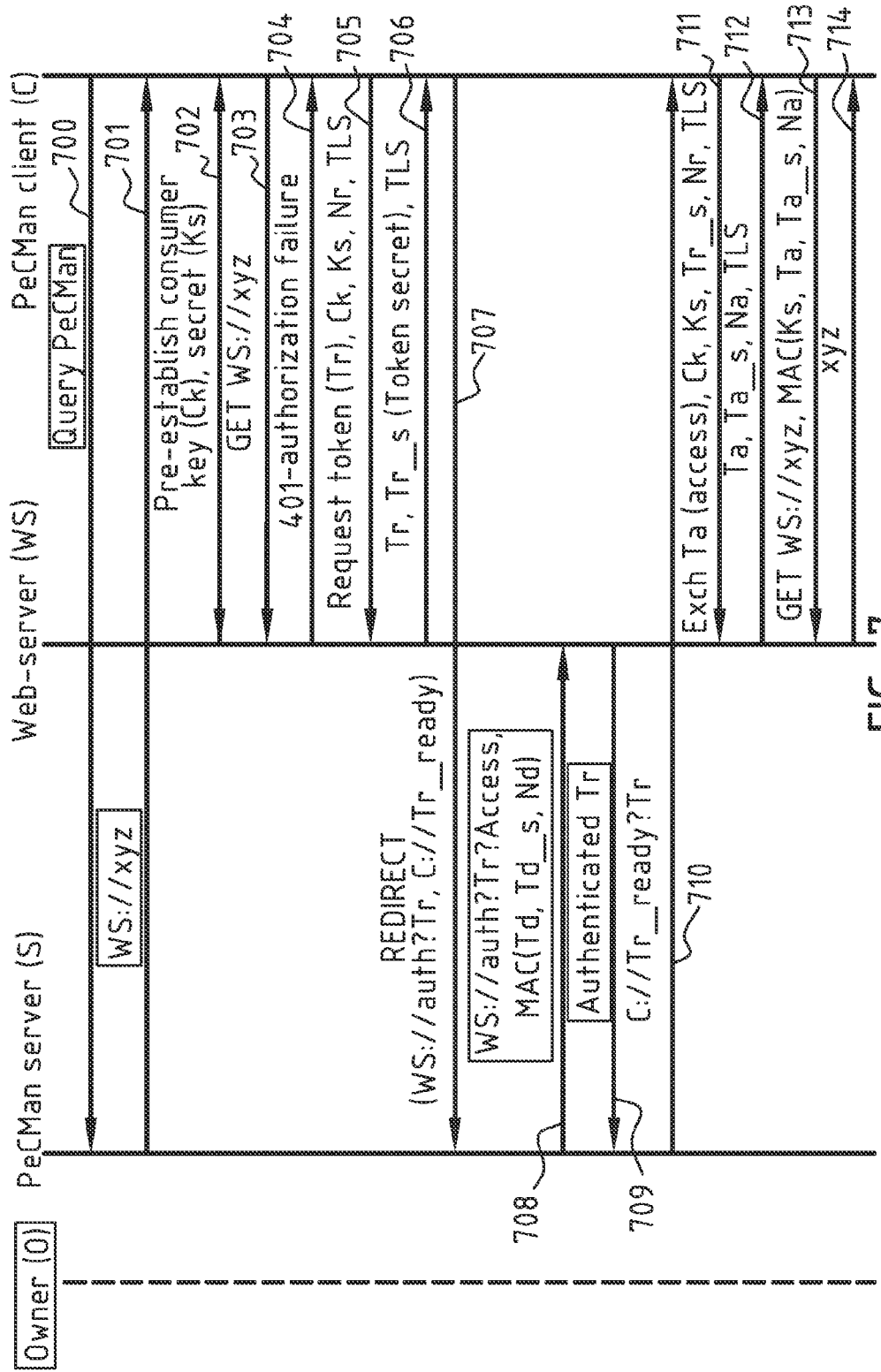
FIG. 7 illustrates a call flow according to a fourth embodiment of a method of the invention for retrieving private content by a secondary PeCMan client.

FIG. 7 shows a variant of the embodiment of the procedure of FIG. 4 for accessing private content by way of a delegated token Td. Steps 700-704 are similar to steps 400-404. The client then requests and obtains a request token Tr from the Web-server WS, see steps 705 and 706 via a TLS tunnel with the following parameters: the common key Ck, the secret key Ks, and a nonce Nr. The request token Tr is offered to the PeCMan server for authentication (step 707) assuming that a delegation token Td exists for the content. When the PeCMan server receives the authentication request with the client's request token, the PeCMan server determines who requests access to the content. If the PeCMan server can grant access to client, it authorizes access using a signature (Mandatory Acces Control, MAC) generated using the following parameters: its delegation token Td, delegation secret Td_s and nonce Nd, see step 708. When the Web-server WS receives the authentication request 708 based on the delegation token, the Web-server authenticates the client's request token Tr, see step 709. This request token Tr is then sent back through PeCMan to the requesting secondary client, see step 710. The requesting client completes the procedure using standard OAuth procedure calls (steps 711-714) on receipt on the authenticated request token Tr: the client exchanges the authenticated request token Tr_s for an access token Ta via a TLS tunnel (steps 711 and 712). The actual data xyz can then be obtained by offering the access token Ta to the Web-server (in the form of a signature using the secret key Ks, Ta, the token secret Ta_s, and a nonce Na), see step 713, whereupon the data xyz is sent to the client, see step 714.

Figure 8:
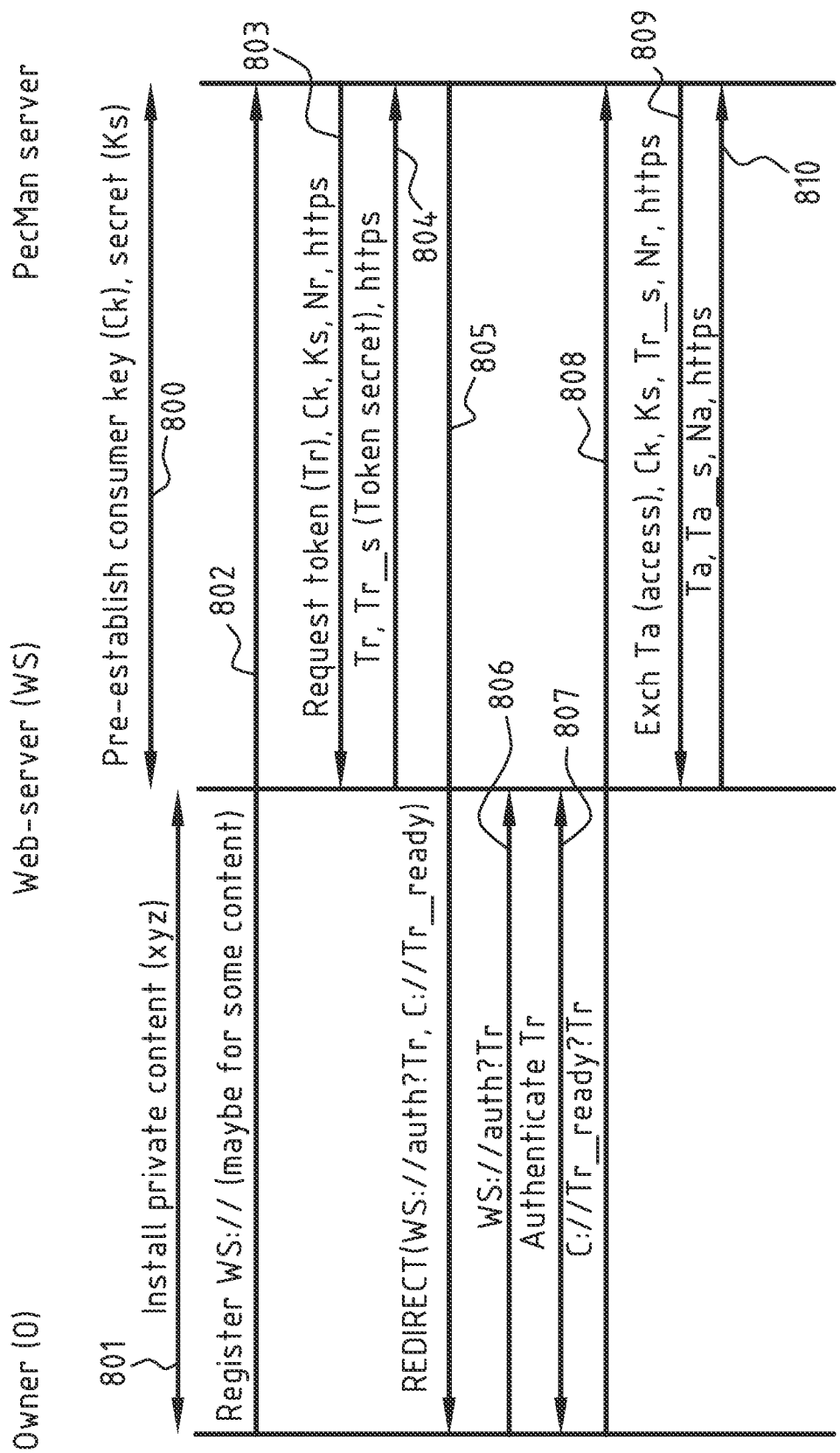
FIG. 8 illustrates a call flow according to a third embodiment of a method of the invention for delegating a PeCMan server.

FIG. 8 illustrates a variant of the method of FIG. 2 for enabling an access-token holder to further delegate tokens, wherein token T1 and T1s in FIG. 2 correspond with Tr and Tr_s, and token T2 and T2s with Ta and Ta_s. In this embodiment, the PeCMan server can be considered as an OAuth consumer performing the standard procedure calls (steps 803-810) for requesting and obtaining an access token for certain content previously installed by the owner on a Web-server and registered with the Pecman server (steps 801-803). With the access token Ta the PeCMan server holds, it can further create and delegate access tokens to new secondary clients. In this embodiment use is made of https tunnels for requesting and exchanging tokens using as parameters a common key Ck, a secret key Ks and a nonce Nr.

Figure 9:
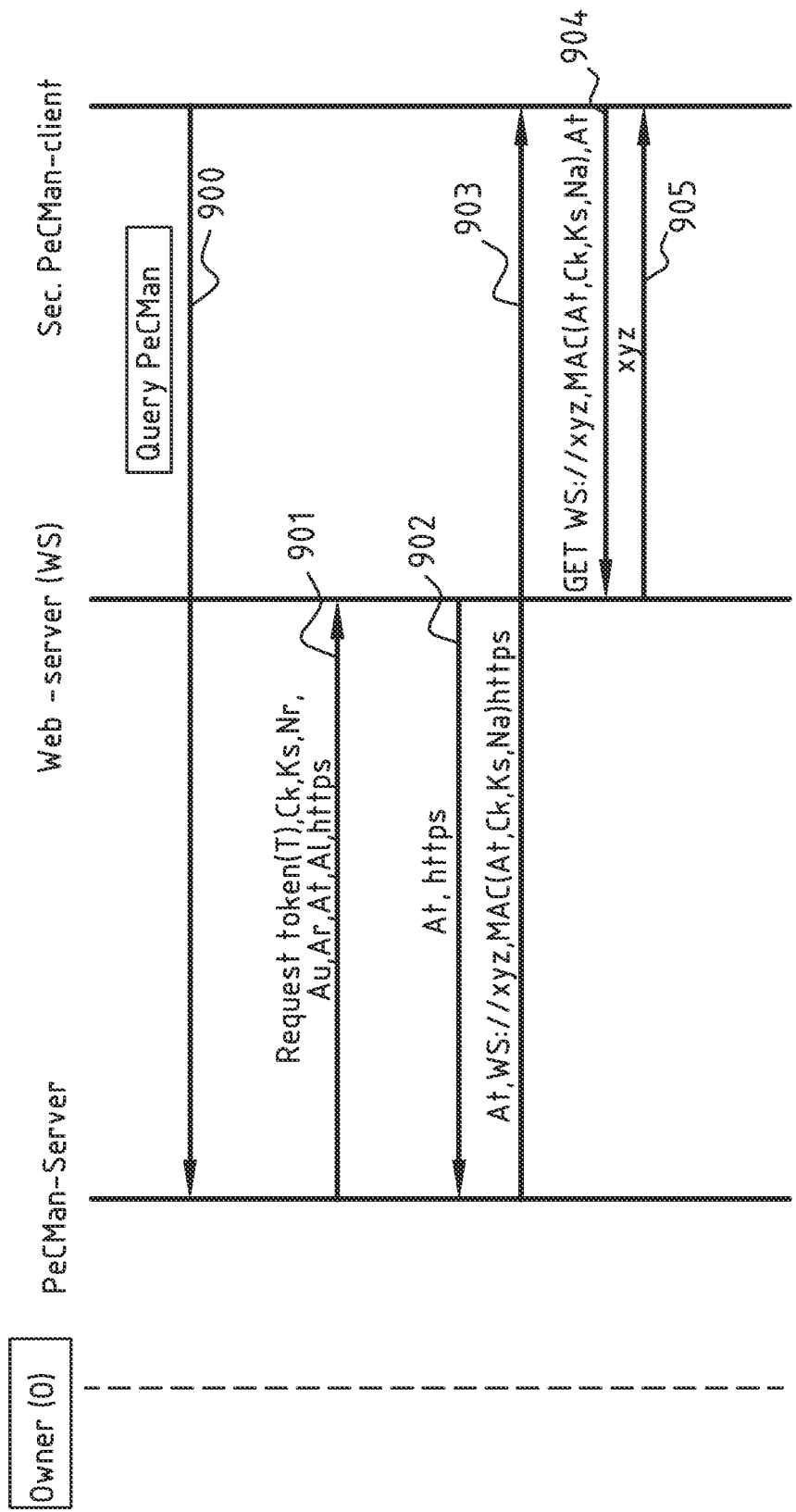
FIG. 9 illustrates a call flow according to a fifth embodiment of a method of the invention for retrieving private content.

A further embodiment of a method for retrieving of an access token by the secondary client is illustrated in the FIG. 9. This embodiment is similar to the embodiment of FIG. 3, and the steps 900-905 are similar to the steps 300-305, wherein token T3 corresponds with access token At. In the embodiment of FIG. 9 https tunnels are used for requesting and exchanging tokens using as parameters a common key Ck, a secret key Ks and a nonce Nr. Instead of working with token secrets Ts3 in FIG. 2, the embodiment of FIG. 9 uses a signature (MAC) based on the following parameter set: At, Ck, Ks, and a nonce Na, to provide the necessary security. The newly created access tokens At may have equal or less rights when compared to the original access tokens Ta obtained by PeCMan (see FIG. 8). With these derived access tokens At the secondary PeCMan clients can obtain content directly from a Web-server WS without having to interact with the owner O.

A person skilled in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

While the principles of the invention have been set out above in connection with specific embodiments, it is to be clearly understood that this description is merely made by way of example and not as a limitation of the scope of protection which is determined by the appended claims.

The invention claimed is:

1. A method for providing access to private digital content owned by an owner and installed on a content server, wherein a content manager server has a number of clients potentially interested in the private digital content, the method comprising the steps of:
    being informed, at a content management server, that the owner has installed private digital content on a content server;
    obtaining, at the content management server, a delegate token from the content server, the delegate token being generated with the help of the owner of the private digital content and being used to speak for the owner of the private digital content, wherein a request for the delegate token comprises a consumer key and access rights related to the private digital content;
    receiving, at the content management server, a query for the private digital content from a client of the number of clients of the content management server; and
    providing, at the content management server, said client with a token using the delegate token enabling the client to access the private digital content.

2. The method according to claim 1, wherein the obtaining, at the content management server, a delegate token from the content server further comprises:
    obtaining a first token from the content server;
    requesting the owner to authorize the first token;
    receiving an authorized first token; and
    requesting to replace the authorized first token with a second token through the content server, wherein said second token forms the delegate token.

3. The method according to claim 1, wherein the step of providing, at the content management server, said client with a token using the delegate token further comprises the steps of:
    sending a request for exchanging the delegate token for an access token for the client to the content server;
    receiving the access token; and
    forwarding the access token to the client.

4. The method according to claim 1, wherein the step of providing, at the content management server, said client with a token using the delegate token further comprises the steps of:
    receiving a request token from the client;
    authorizing said token using the delegate token; and
    sending said authorized request token to the client enabling the client to change the authorized request token for an access token through the content server.

5. A method for obtaining private digital content by a client of a content management server, wherein the private digital content is owned by an owner and installed on a content server, comprising the following steps performed by the client:
    sending a request for obtaining private digital content to the content management server having a delegate token associated with the private digital content, the delegate token being obtained by the content management server from a content server and generated with the help of the owner of the private digital content and being used to speak for the owner of the content, wherein the request for the delegate token comprises a consumer key and access rights related to the private digital content;
    obtaining a token from the content management server generated using the delegate token and allowing the client to access the private digital content; and
    accessing the private digital content.

6. The method of claim 5, wherein the step of obtaining a token from the content management server further comprises the step of obtaining an access token which has been obtained previously by the content management server on the basis of his delegate token through the content server.

7. The method of claim 5, wherein the step of obtaining a token from the content management server further comprises the following steps performed by the client:
    sending a request for a token to the content server;
    receiving the request token from the content server;
    sending the received request token to the content management server for being authorized;
    receiving the request token authorized by the content management server using his delegate token;
    sending this authorized request token to the content server; and
    receiving an access token from the content server enabling the client to access the private content.

8. A method for providing access to private digital content by a client of a content management server, wherein the private digital content is owned by an owner and installed on a content server, comprising the steps of:
    generating, at the content server, a delegate token for the content management server which is authorized by the user, the delegate token being generated with the help of the owner of the private digital content and being used to speak for the owner of the content, wherein a request for the delegate token comprises a consumer key and access rights related to the private digital content; and
    sending, at the content server, said delegate token to the content management server.

9. The method of claim 8, wherein a protocol that handles user credentials between multiple parties is used for performing the method steps.

10. A system for accessing private digital content, comprising:
    a content management server;
    a primary client owning private digital content stored on a content server; and
    a number of secondary clients;
    wherein the content management server is adapted to obtain a delegate token associated with the private digital content from the content server and to deliver a token to one of the number of secondary clients using the delegate token enabling the one of the number of the secondary clients to access the private digital content, the delegate token being generated with the help of the owner of the private digital content and being used to speak for the owner of the content, wherein a request for the delegate token comprises a consumer key and access rights related to the private digital content; and wherein the one of the number of the secondary clients is adapted to present the delivered token to the content server to obtain access to the private digital content.

11. The system of claim 10, wherein the primary client is adapted to authorize a request token received from the content management server through the content server; and said content management server is adapted to receive the authorized request token and to obtain a delegate token using the authorized request token.

12. A content management server for organizing private digital content of a plurality of clients, a primary client owning private digital content stored on a content server, said content management server being adapted to obtain from the content server a delegate token associated with the private digital content of an owner client, and to deliver a token to a secondary client using the delegate token to enable the secondary client to access the private content of the owner client, wherein a request for the delegate token comprises a consumer key and access rights related to the private digital content, said delegate token being generated with the help of the owner of the private digital content and being used to speak for the owner of the content.

13. The content management server of claim 12, wherein the content management server is a content aggregator.

14. The content management server of claim 12, wherein the content management server is further adapted to provide a client with a token related to the private content having equal or less access rights when compared with the delegate token.

15. A non-transitory computer-readable medium having computer-executable instructions for performing steps, comprising:

being informed, at a content management server, that the owner has installed private content on a content server;

obtaining, at the content management server, a delegate token from the content server, the delegate token being generated with the help of the owner of the private digital content and being used to speak for the owner of the content, wherein a request for the delegate token comprises a consumer key and access rights related to the private digital content;

receiving, at the content management server, a query for the private digital content from a client of the number of clients of the content management server; and providing, at the content management server, said client with a token using the delegate token enabling the client to access the private content.

16. The method according to claim 1, further comprising the step of establishing, at the content management server, a secure connection with the content server via a Transport Layer Security (TLS) protocol.

17. The method according to claim 2, further comprising the step of sending a redirect message to the owner to obtain authorization.

18. The method according to claim 1, wherein the request for the delegate token comprises the consumer key, the access rights related to the private digital content and a time period in which the delegate token is valid.

19. The method according to claim 1, wherein the request for the delegate token comprises the consumer key, the access rights related to the private digital content and a timestamp.

* * * * *